United States Patent
Gabriel et al.

(10) Patent No.: US 8,862,302 B1
(45) Date of Patent: Oct. 14, 2014

(54) VEHICLE AND METHOD FOR CONTROLLING AN ELECTRIC MACHINE

(71) Applicant: Ford Global Technologies, LLC, Dearborn, MI (US)

(72) Inventors: David Crist Gabriel, Royal Oak, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 13/909,499

(22) Filed: Jun. 4, 2013

(51) Int. Cl.
| | |
|---|---|
| *B60L 3/06* | (2006.01) |
| *B60W 10/08* | (2006.01) |
| *B60W 20/00* | (2006.01) |
| *B60W 30/184* | (2012.01) |
| *B60L 3/00* | (2006.01) |
| *H02P 29/02* | (2006.01) |
| *B60W 30/18* | (2012.01) |
| *B60L 15/20* | (2006.01) |

(52) U.S. Cl.
CPC .............. *B60L 3/06* (2013.01); *B60W 30/1843* (2013.01); *B60L 3/0061* (2013.01); *H02P 29/028* (2013.01); *B60W 2540/10* (2013.01); *B60W 2710/083* (2013.01); *Y02T 10/642* (2013.01); *B60W 2510/087* (2013.01); *B60W 30/18118* (2013.01); *B60L 15/20* (2013.01)
USPC .......................................... 701/22; 180/65.8

(58) Field of Classification Search
None
See application file for complete search history.

(56) References Cited

U.S. PATENT DOCUMENTS

| | | | |
|---|---|---|---|
| 6,469,462 B2 | 10/2002 | Shimane et al. | |
| 6,825,624 B2 | 11/2004 | Anwar et al. | |
| 7,911,167 B2 * | 3/2011 | Takeuchi | 318/432 |
| 8,145,374 B2 | 3/2012 | Farnsworth | |
| 2012/0143414 A1 * | 6/2012 | Shin et al. | 701/22 |
| 2012/0185143 A1 * | 7/2012 | Ohno | 701/99 |

FOREIGN PATENT DOCUMENTS

| | | | |
|---|---|---|---|
| JP | 2005-277550 | * | 4/2005 |
| JP | 2010-011545 | * | 1/2010 |
| JP | 2010-011546 | * | 1/2010 |
| JP | 2011-259601 | * | 12/2011 |
| JP | 2012-178917 | * | 9/2012 |

* cited by examiner

*Primary Examiner* — Michael J Zanelli
(74) *Attorney, Agent, or Firm* — David B. Kelley; Brooks Kushman P.C.

(57) ABSTRACT

A vehicle having an electric machine arrangement, including an electric machine operable to drive the vehicle includes a control system having at least one controller. The control system is configured to implement a method for thermal mitigation of the electric machine arrangement. The thermal mitigation strategy is controlled such that a time between successive implementations of the strategy is inversely related to a temperature of at least a portion of the electric machine arrangement, and the time between two successive implementations of the thermal mitigation strategy may decrease with each successive pair of implementations.

20 Claims, 2 Drawing Sheets

VEHICLE AND METHOD FOR CONTROLLING AN ELECTRIC MACHINE

TECHNICAL FIELD

The present invention relates to a vehicle and method for controlling a vehicle to implement a thermal mitigation strategy for an electric machine arrangement, including electric machine operable to drive the vehicle.

BACKGROUND

Keeping a vehicle stationary while it is on an inclined surface can present particular challenges for electric vehicles. For example, if an electric machine, such as an electric motor, is used exclusively to maintain the vehicle position—i.e., the friction brakes are not employed—the electric motor may overheat if it is maintained in one position for too long. This may be the result of a high concentration of current within one or two phases of the inverter and stator, which, in addition to merely raising the temperature of the motor, can result in a non-uniform temperature increase, creating the potential for localized component damage.

Some control systems for electric vehicles may employ a mitigation strategy that shuts down the motor upon the occurrence of an undesirable event, such as a critical temperature being reached. This can result in vehicle behavior that may not be expected by the vehicle operator, and therefore is undesirable. Therefore, a need exists for a vehicle and method for controlling a vehicle to implement a thermal mitigation strategy that allows the vehicle to be maintained in a stationary position for a longer period of time before the motor must be completely shut down.

SUMMARY

At least some embodiments of the present invention include a method for controlling a vehicle having an electric machine arrangement, including an electric machine operable to drive the vehicle, wherein the method includes controlling a time between implementations of a thermal mitigation strategy for the electric machine arrangement such that a time between successive implementations of the thermal mitigation strategy is inversely related to a temperature of the electric machine.

At least some embodiments of the present invention include a method for controlling a vehicle having an electric machine arrangement, including an electric machine operable to drive the vehicle, wherein the method includes controlling a time between implementations of a thermal mitigation strategy for the electric machine arrangement such that a time between two successive implementations of the thermal mitigation strategy is less than a time between two previous successive implementations of the thermal mitigation strategy.

At least some embodiments of the present invention include a vehicle having an electric machine arrangement, including an electric machine operable to drive the vehicle, the vehicle including a control system having at least one controller. The control system is configured to control a time between implementations of a thermal mitigation strategy for the electric machine arrangement such that a time between two successive implementations of the thermal mitigation strategy is less than a time between two previous successive implementations of the thermal mitigation strategy.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
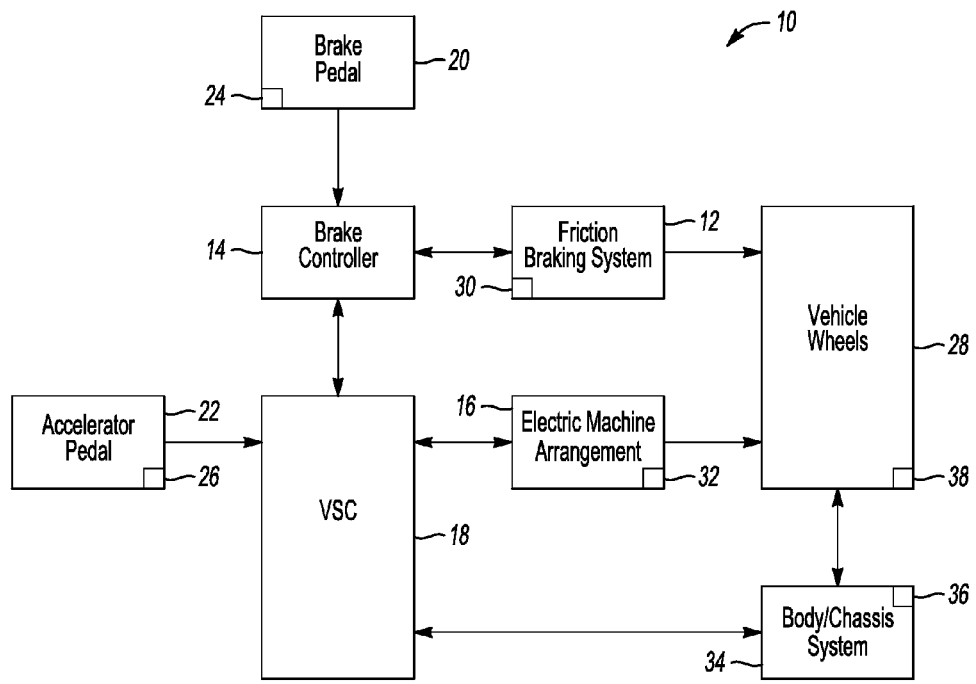
FIG. 1 shows a simplified schematic diagram of a vehicle in accordance with the present invention.

FIG. 1 shows a simplified schematic diagram of a portion of a vehicle 10 in accordance with the present invention. The vehicle 10 includes a friction braking system 12, controlled by a brake controller 14. The vehicle 10 also includes an electric machine arrangement 16, which includes at least one electric machine, such as an electric motor, operable to drive the vehicle 10, and which may be capable of capturing regenerative braking energy. The electric machine arrangement 16 may also include such components as inverters, voltage controllers, wiring, and/or other components associated with the electric machine(s). In the embodiment shown in FIG. 1, the electric machine arrangement 16 is controlled by a vehicle system controller (VSC) 18; however, in other embodiments, one or more dedicated controllers, such as motor controllers, may directly control the electric machine arrangement 16, while communicating with other system controllers, such as the VSC. The VSC 18 may include other controllers, such as a powertrain control module (PCM). In fact, the brake controller 14, shown in FIG. 1 as a separate controller, may be integrated into the VSC 18. Thus, the various systems within the vehicle 10 can be controlled by a single controller, separate software controllers within a single hardware device, or a combination of separate software and hardware controllers.

The brake controller 14 receives vehicle operator inputs from a brake pedal 20, and the VSC 18 receives operator inputs from an accelerator pedal 22. In particular, a brake pedal angle sensor 24 (which can be more than one sensor or type of sensor), is configured to detect the position of the brake pedal 20, and send one or more signals to the brake controller 14. Similarly, an accelerator pedal sensor 26 (which can also be more than one sensor), is configured to detect the position of the accelerator pedal 22, and send one or more signals to the VSC 18. The VSC 18 and the brake controller 14 use various inputs, including the inputs from the sensors 24, 26, to decide how to control the friction braking system 12 and a regenerative braking system that utilizes the electric machine arrangement 16. The friction braking system 12 operates to slow the speed of vehicle wheels 28 through the application of one or more friction elements in accordance with methods well known in the art. Similarly, the electric machine arrangement 16, and in particular, one or more electric machines within the electric machine arrangement 16, is operable to reduce the speed of the vehicle wheels 28 by producing a negative torque which is transferred through the powertrain to the vehicle wheels 28.

The friction braking system 12 includes one or more sensors, represented in FIG. 1 by a single sensor 30. The sensor 30 is configured to send signals to the brake controller 14 related to various conditions within the friction braking system 12. For example, if the friction braking system 12 should experience reduced braking capability, perhaps due to a loss of boost or the loss of a hydraulic circuit, the sensor 30 can communicate this condition to the brake controller 14, which in turn communicates with the VSC 18. Similarly, the electric machine arrangement 16 has one or more sensors, represented in FIG. 1 by the sensor 32. The sensor or sensors 32 may detect such conditions as motor speed, motor torque, power, component temperature—e.g., the temperature of the rotor, stator, inverter, etc.—component position, etc. The sensor 32 communicates directly with the VSC 18, which can use these inputs in combination with the other inputs to control various functions of the vehicle 10, such as the thermal mitigation strategy described below.

The vehicle 10 also includes a body/chassis system 34. The body/chassis system 34 includes structural elements of the vehicle 10, including such things as a vehicle suspension system. The vehicle wheels 28, shown separately in FIG. 1, may be considered a part of the larger body/chassis system 34. One or more sensors, shown in FIG. 1 as a single sensor 36, are configured to detect various conditions of the body/chassis system 34, and to communicate with the VSC 18. The sensor 36 may detect such conditions as the deflection of, or the load on, various elements of the body/chassis system 34. Similarly, a sensor 38, which represents one or more sensors, is configured to detect conditions of the vehicle wheels 28, including the wheel speed. The sensor 38 is shown in FIG. 1 communicating with the larger body/chassis system 34, which in turn communicates with the VSC 18. Alternatively, the sensor 38 can be directly connected to the VSC 18.

Figure 2:
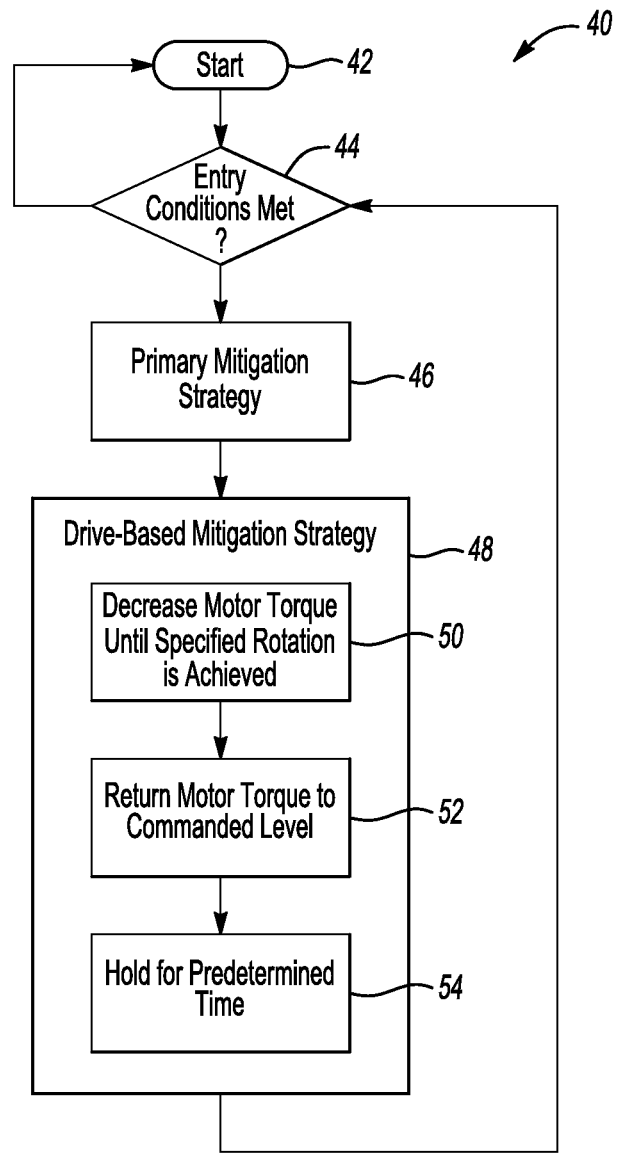
FIG. 2 shows a flowchart illustrating a method in accordance with an embodiment of the present invention.

The VSC 18, alone or in conjunction with one or more other controllers in the vehicle 10, may be programmed to implement a thermal mitigation strategy in accordance with embodiments of the present invention. The thermal mitigation strategy is aimed at controlling a motor, such as a traction motor—i.e., a motor used to drive the vehicle—so that it is not damaged by very high temperatures maintained for an extended period of time. The thermal mitigation strategy may be implemented, for example, when a vehicle is on an inclined surface and is being held stationary exclusively through the use of motor torque. FIG. 2 shows a flowchart 40 illustrating such a method. At step 42, the method is started and a decision is made at decision block 44 as to whether certain entry conditions are met.

The entry conditions may be preprogrammed into a controller, such as the VSC 18, and may include, in at least some embodiments, the motor position changing less than a predetermined amount per unit time, and at least one of the following other criteria: the accelerator pedal position changing less than a predetermined amount per unit time, a motor coil temperature rising faster than a predetermined amount per unit time, the motor inverter temperature rising faster than a predetermined amount per unit time, or the motor rotor temperature rising faster than a predetermined amount per unit time. Of course, these are just examples of criteria that can be used as entry conditions in embodiments of the invention, and other such criteria could include different combinations of the aforementioned criteria, or criteria not listed above, but which would provide an indicator that a thermal mitigation strategy is desired for the electric machine arrangement. At least some of these criteria are indicative of a vehicle being disposed on an inclined surface while an operator of the vehicle uses an accelerator pedal exclusively to hold the vehicle at a substantially constant position. Another way in which such a vehicle state might be indicated is if the brake pedal of the vehicle is disengaged, the motor is producing a non-zero torque, and the speed of the vehicle is substantially zero.

If it is determined that the entry conditions are not met, the method loops back to the start at step 42; however, if the entry conditions are met, a primary or initial mitigation strategy is implemented at step 46. The primary mitigation strategy may include, for example, such actions as increasing a flow rate of cooling media associated with electric machine arrangement, for example, the motor and/or motor electronics. This could include such things as increasing the speed of oil pumps, coolant pumps, or fans. Although it is possible that the primary mitigation strategy could cool the electric machine arrangement enough so that the entry conditions would no longer be met—in which case, the method would loop back to the start at step 42—it is more likely that the more specific thermal mitigation strategy will be necessary, which is shown generally at block 48 and entitled "Drive-Based Mitigation Strategy".

The thermal mitigation strategy shown at block 48 includes a number of steps, starting with step 50 where the motor torque is decreased until a specified rotation is achieved. In the case of the vehicle on an inclined surface, this reduction in torque will facilitate a reverse movement of the vehicle (or forward if the vehicle is facing down an incline) and a relative movement between the rotor and windings in the motor. At step 52, the motor torque is returned to the commanded level—i.e. to the level commanded by the driver based on the accelerator pedal position—after the relative rotational movement between the rotor and the windings of the motor has reached a predetermined amount. This can be measured, for example, by a positional sensor: such sensors being commonly found on electric motors and used for a variety of purposes. In at least some embodiments, the predetermined amount will represent a rotation of one or two electrical phases. This will redistribute the current concentrations to different stator windings and inverter hardware while minimizing the deviation from driver intent. This will allow the heat to be more evenly distributed among all three phases of the motor and inverter, and will also provide a small, tactile notification to the driver to take action to change the driving mode.

If the driver does not take action, and the vehicle remains stationary, held in place by the electric motor, another iteration of the thermal mitigation strategy may be required. After the motor torque is returned to the commanded level, the vehicle is held in place for a predetermined time—this is shown at step 54. As discussed in more detail below, the predetermined time can be based on a number of factors such as the temperature of at least a portion of the electric machine arrangement. This may be, for example, the present temperature of the motor, a maximum allowable temperature of the motor, and a rate of temperature increase of the motor (or other component), among other parameters. If the status of the vehicle has not changed after the predetermined time has passed, the method loops back to decision block 44 to determine if the entry conditions are still met; if they are, another iteration of the primary and drive-based mitigation strategies are implemented. While iterating in this loop, it is likely that the primary mitigation strategy indicated at step 46 is still being implemented—i.e., flow rates for cooling media are still at increased levels; if this is the case, the strategy immediately goes to the second iteration of the drive-based mitigation strategy 48.

During the second iteration of the drive-based mitigation strategy 48, the motor torque is again decreased (step 50), it is returned to its commanded level after a predetermined amount of motor rotation (step 52), and it is again held for a predetermined time (step 54); however, it is likely that the predetermined time will be less than the predetermined time was during the first iteration. This is because embodiments of the present invention employ a frequency-based thermal mitigation strategy that allows small movements of the electric motor to take place repeatedly with increasingly short hold times before the motor ultimately gets too hot and must be shut down. Although any number of formulas or relationships may be used to define a hold period, one such formula is shown below.

$$\text{Period} = K_{per} * \left( \frac{T_{max} - T_0}{\Delta T} \right) \quad \text{Eq. 1}$$

Where:
Period—Duration of one wheel torque reduction/restore cycle
$K_{per}$—Calibratable constant
$T_{max}$—Maximum component temperature for full performance
$T_0$—Current temperature of component
$\Delta T$—Rate of component temperature rise Relating the formula shown in Equation 1 with the flowchart 40 shown in FIG. 2, the "Period" represents the predetermined time for which the vehicle is held stationary (step 54) prior to returning to the beginning of the loop. The value of $K_{per}$ may be based on, for example, various parameters, such as the weight of the vehicle, a gear ratio between the motor output and the transmission output, tire sizes, etc. This value can be preprogrammed into a controller, such as the VSC 18, and in some embodiments may take on a value of approximately 0.4.

As readily seen in Equation 1, the "Period" is inversely related to the present temperature of the component ($T_0$) of the electric machine arrangement under evaluation, and is further inversely related to the rate of temperature rise of that component ($\Delta T$). As each iteration of the drive-based mitigation strategy 48 takes place, it is likely that the time between two successive implementations—i.e., the current Period—will be less than the time between two previous successive implementations—i.e., the previous Period. Therefore, it is apparent that as used herein, the term "predetermined time" does not imply a static or constant value, but rather a value which may be iteratively calculated on an ongoing basis—although it is possible that during such iterations, the value of one "predetermined time" calculation could be the same as a previously calculated value. This is illustrated in the graph and 56 shown in FIG. 3. The graph 56 shows a constant driver demand, indicated by the dashed line 58—this is indicative of a constant accelerator pedal position. As discussed above, the speed of the vehicle is substantially zero even though the torque output by the motor is positive. Therefore, without implementation of the thermal mitigation strategy, the torque command, indicated by the solid line 60 in FIG. 3, would also be constant. This is not the case, however, and the torque line 60 shows three separate reductions in torque 62, 64, 66.

Applying the method illustrated in the flowchart 40 shown in FIG. 2, along with the formula shown in Equation 1, to the graph 56, yields the following. The torque reduction 62 indicates a first implementation of the drive-based mitigation strategy 48. The predetermined time indicated at step 54 is graphically illustrated in FIG. 3 as "Period 1". Assuming that the vehicle is still held stationary on the incline, the drive-based mitigation strategy is implemented a second time. This time, however, one or more of the parameters set forth in Equation 1 have changed, for example, the present temperature of the motor or some other component of the electric machine arrangement, or the rate of temperature rise in the motor or other component, or both, has increased. Therefore, the predetermined time set forth in step 54 in FIG. 2 is calculated (by Equation 1) to be less than it was during the first iteration—i.e., Period 2 is less than Period 1. This is graphically illustrated in in FIG. 3. Stated another way, the time between two successive implementations of the thermal mitigation strategy—indicated by torque reductions 64, 66—is less than the time between two previous successive implementations of the thermal mitigation strategy—indicated by torque reductions 62, 64. As used herein, the term "successive implementations" indicates implementations of strategy within the iterative loop shown in the flowchart 40 in FIG. 2. That is, once the entry conditions are no longer met and the thermal mitigation strategy has ceased to be implemented, a new entry into the mitigation strategy is not considered to be "successive" with the previous implementation.

Figure 3:
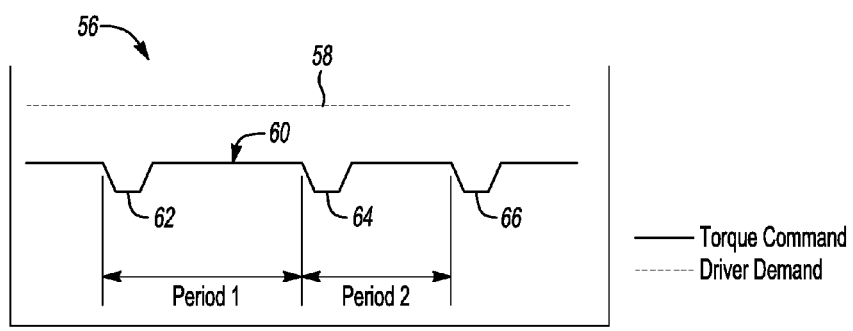
FIG. 3 shows a graph indicating the time between successive implementations of a thermal mitigation strategy in accordance with embodiments of the present invention.

As shown in the graph 56 in FIG. 3, the torque command line 60 appears to continue beyond the torque reduction 66. It is contemplated that embodiments of the frequency-based thermal mitigation strategy of the present invention—e.g., the drive-based mitigation strategy 48 shown in FIG. 2—will continue for several iterations before the motor becomes so hot that it is necessary to completely shut it down. During this time the frequency of implementation will increase, which means the "Periods" will decrease. In this way, the driver is able to maintain a desired position for longer as compared to control systems that do not provide incremental torque reductions, but merely wait for the motor to reach a maximum temperature before shutdown. Of course, it is possible that a vehicle will be held stationary on incline for such a long time that a present temperature of at least a portion of the electric machine arrangement, for example, the motor, could reach a maximum allowable temperature, even though the thermal mitigation strategy described above is repeatedly implemented. Referring to Equation 1, this would occur when $T_0 = T_{max}$. When this occurs, a final mitigation strategy may be implemented, whereby the torque output of the motor is commanded to zero.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle having an electric machine arrangement, including an electric machine operable to drive the vehicle, comprising:
controlling a time between implementations of a thermal mitigation strategy for the electric machine arrangement such that a time between successive implementations of the thermal mitigation strategy is inversely related to a temperature of at least a portion of the electric machine arrangement.

2. The method of claim 1, wherein the time between successive implementations of the thermal mitigation strategy is further inversely related to a rate of temperature rise of at least a portion of the electric machine arrangement.

3. The method of claim 1, wherein the thermal mitigation strategy is implemented when a set of conditions are met, including: the vehicle being disposed on an inclined surface and an operator of the vehicle using an accelerator pedal exclusively to hold the vehicle at a substantially constant position.

4. The method of claim 3, wherein the thermal mitigation strategy includes:
reducing torque produced by the electric machine, thereby facilitating a reverse movement of the vehicle and a relative rotational movement between a rotor and windings in the electric machine, and
increasing the torque produced by the electric machine after the relative rotational movement between the rotor and windings has reached a predetermined amount.

5. The method of claim 1, further comprising implementing an initial mitigation strategy prior to implementing the thermal mitigation strategy, the initial mitigation strategy including increasing a flow rate of cooling media associated with the electric machine arrangement.

6. The method of claim 1, further comprising implementing a final mitigation strategy when a present temperature of at least a portion of the electric machine arrangement reaches a maximum allowable temperature of the electric machine, the final mitigation strategy including commanding torque produced by the electric machine to zero.

7. A method for controlling a vehicle having an electric machine arrangement, including an electric machine operable to drive the vehicle, comprising:
controlling a time between implementations of a thermal mitigation strategy for the electric machine arrangement such that a time between two successive implementations of the thermal mitigation strategy is less than a time between two previous successive implementations of the thermal mitigation strategy.

8. The method of claim 7, wherein the thermal mitigation strategy is implemented when a set of conditions are met, including: a brake pedal of the vehicle being disengaged, the electric machine producing a non-zero torque, and a speed of the vehicle being substantially zero.

9. The method of claim 8, wherein the thermal mitigation strategy includes:
reducing the torque produced by the electric machine, thereby facilitating a reverse movement of the vehicle and a relative rotational movement between a rotor and windings in the electric machine, and
increasing the torque produced by the electric machine after the relative rotational movement between the rotor and windings has reached a predetermined amount.

10. The method of claim 9, wherein a time between successive implementations of the thermal mitigation strategy defines a period, and the period is based on at least a present temperature of at least a portion of the electric machine arrangement and a maximum allowable temperature of the at least a portion of the electric machine arrangement.

11. The method of claim 10, wherein the period is further based on a rate of temperature increase for at least a portion of the electric machine arrangement.

12. The method of claim 9, further comprising implementing an initial mitigation strategy prior to implementing the thermal mitigation strategy, the initial mitigation strategy including increasing a flow rate of cooling media associated with the electric machine arrangement.

13. The method of claim 12, further comprising implementing a final mitigation strategy when a present temperature of at least a portion of the electric machine reaches a maximum allowable temperature of the at least a portion of the electric machine, the final mitigation strategy including commanding the torque produced by the electric machine to zero.

14. A vehicle having an electric machine arrangement, including an electric machine operable to drive the vehicle, comprising:
a control system having at least one controller, the control system being configured to control a time between implementations of a thermal mitigation strategy for the electric machine arrangement such that a time between two successive implementations of the thermal mitigation strategy is less than a time between two previous successive implementations of the thermal mitigation strategy.

15. The vehicle of claim 14, wherein the control system is further configured to implement the thermal mitigation strategy when a set of conditions are met, including: the vehicle being disposed on an inclined surface and an operator of the vehicle using an accelerator pedal exclusively to hold the vehicle at a substantially constant position.

16. The vehicle of claim 14, wherein the control system is further configured to implement the thermal mitigation strategy such that torque produced by the electric machine is reduced, thereby facilitating a reverse movement of the vehicle and a relative rotational movement between a rotor and windings in the electric machine, and such that the torque produced by the electric machine is increased after the relative rotational movement between the rotor and windings has reached a predetermined amount.

17. The vehicle of claim 16, wherein a time between successive implementations of the thermal mitigation strategy defines a period, and the period is based on at least a present temperature of at least a portion of the electric machine arrangement and a maximum allowable temperature of the at least a portion of the electric machine arrangement.

18. The vehicle of claim 17, wherein the period is further based on a rate of temperature increase for at least a portion of the electric machine arrangement.

19. The vehicle of claim 16, wherein the control system is further configured to implement an initial mitigation strategy prior to implementing the thermal mitigation strategy, the initial mitigation strategy including increasing a flow rate of cooling media associated with the electric machine arrangement.

20. The vehicle of claim 19, wherein the control system is further configured to implement a final mitigation strategy when a present temperature of at least a portion of the electric machine arrangement reaches a maximum allowable temperature of the at least a portion of the electric machine arrangement, the final mitigation strategy including commanding torque produced by the electric machine to zero.

* * * * *